US009195708B2

(12) United States Patent
Chen et al.

(10) Patent No.: US 9,195,708 B2
(45) Date of Patent: Nov. 24, 2015

(54) CONTINUOUS QUERYING OF A DATA STREAM

(75) Inventors: Qiming Chen, Cupertino, CA (US); Meichun Hsu, Los Altos Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 211 days.

(21) Appl. No.: 13/878,473

(22) PCT Filed: Oct. 14, 2010

(86) PCT No.: PCT/US2010/052709
§ 371 (c)(1),
(2), (4) Date: Apr. 9, 2013

(87) PCT Pub. No.: WO2012/050582
PCT Pub. Date: Apr. 19, 2012

(65) Prior Publication Data
US 2013/0191413 A1  Jul. 25, 2013

(51) Int. Cl.
*G06F 17/30* (2006.01)
(52) U.S. Cl.
CPC .... *G06F 17/30424* (2013.01); *G06F 17/30516* (2013.01)
(58) Field of Classification Search
CPC ................................................. G06F 17/30424
USPC ....................................................... 707/769
See application file for complete search history.

(56) References Cited

U.S. PATENT DOCUMENTS

| 2008/0016095 A1 | 1/2008 | Bhatnagar |
| 2009/0106214 A1 | 4/2009 | Jain |
| 2009/0228434 A1* | 9/2009 | Krishnamurthy et al. ........ 707/2 |
| 2009/0228465 A1 | 9/2009 | Krishnamurthy et al. |
| 2010/0124240 A1* | 5/2010 | Lu et al. ........................ 370/503 |

FOREIGN PATENT DOCUMENTS

| CN | 101848395 | 9/2010 |
| KR | 10-2010-0107757 | 10/2010 |

OTHER PUBLICATIONS

Botan et al, "Flexibile and Scalable Storage Management for Data-Intensive Stream Processing", Publication Date: Mar. 24-26, 2009.
Neil Conway, "Transactions and Data Stream Processing", Apr. 6, 2008.
Stonebraker et al, "The Eight Rules of Real-Time Stream Processing", handbook article.

(Continued)

*Primary Examiner* — Etienne Leroux
*Assistant Examiner* — Cindy Nguyen
(74) *Attorney, Agent, or Firm* — Hewlett-Packard Patent Department

(57) ABSTRACT

In continuous querying of a data stream, a query including query cycles can be initialized (310) on a query engine to analyze the data stream for desired information. The data stream can be processed (320) as segments, where a size of the segments is based on a user-defined parameter. The query cycles can be synchronized (330) with the segments of the data stream. A first segment can be analyzed (340) by performing the query on the first segment to obtain a first result. A query state of the query can be persisted (350) and the query operation can be rewound to begin a new query cycle. A second segment can be analyzed (360) in the new query cycle by performing the query on the second segment based on the first result.

14 Claims, 4 Drawing Sheets

(56) References Cited

OTHER PUBLICATIONS

Yousuke et al, "Query Result Caching for Multiple Event-Driven Continuous Queries", Apr. 14, 2009.

Zhang, Yang et al, "ICEDB; Intermittently-Connected Continuous Query Processing", Research paper.
Experience in Extending Query Engine for Continuous Analytics—Quiming Chen and Meichun Hsu.

* cited by examiner

CONTINUOUS QUERYING OF A DATA STREAM

BACKGROUND

Queries are often processed over data streams using computers in a system. Such systems typically receive a query that is applied to a stream of data that changes over time rather than static data that is typically found stored in a database. Examples of data streams include real time stock quotes, real time traffic monitoring on highways, or real time packet monitoring on a computer network such as the Internet. In one example, data streams from network monitoring can be processed to detect intrusions and generate online performance metrics in response to queries on the data streams. In some examples, data streams can be infinitely tong and the amount of data too large to be persisted by a database management system.

Some prior systems have proposed use of a query compiler to receive a query and build an execution plan, which includes a tree of natively supported query operators. The query compiler can use the execution plan to update a global query plan which is used by a runtime engine to identify data from incoming streams that matches a query and based on the identified data to generate output data in a streaming fashion.

DETAILED DESCRIPTION

Figure 1:
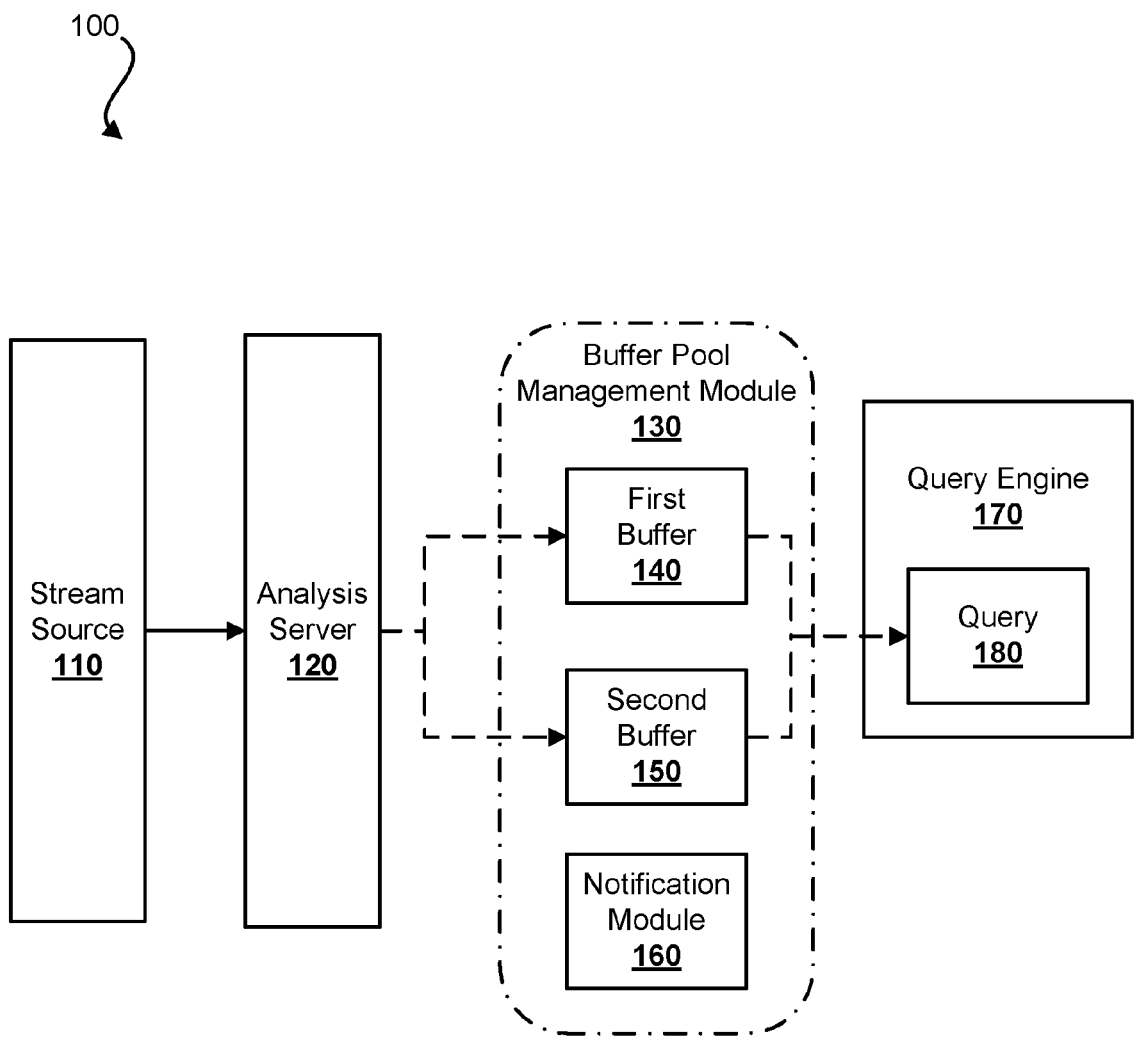
FIG. 1 is a block diagram of a system for continuous analysis of a data stream in accordance with an example.

Reference will now be made to the examples illustrated, and specific language will be used herein to describe the same. It will nevertheless be understood that no limitation of the scope of the technology is thereby intended. Additional features and advantages of the technology will be apparent from the detailed description which follows, taken in conjunction with the accompanying drawings, which together illustrate, by way of example, features of the technology.

In many systems, there is a demand for lower latency queries, even as the volume of data processed in a stream grows rapidly. Traditional query engines, even those executing on streaming data, operate on the principle of loading the data first and then analyzing the data. In these examples, query latency is increased because of the need to wait for data to be loaded into a data warehouse. Furthermore, because the amount of data is often large, complex and data intensive computation platforms, such as Hadoop or Map-Reduce, are used. Current systems are generally not designed to analyze results from event streams in as flexible, efficient, and rapid a manner as many enterprises would desire.

Combining data warehousing and data stream processing technologies has the potential of offering low-latency data-intensive analytics. However, previous solutions have not effectively addressed a convergence of data warehousing and data stream processing. Current data stream processing systems are generally built separately from data warehouses and/or query engines. This separation can result in significant overhead in data access and data movement in data-intensive streaming analytics. Furthermore, building stream processing systems from scratch fails to leverage many of the advances in database management and data warehouse systems. As the complexity of streaming analytics applications increases, many of the functionality in data warehouses is re-created and redeveloped in the stream processing software and machine readable instructions. Some previous examples of query engines for stream processing are characterized by providing a workflow-like service for launching a SQL query for each chunk of the stream data during stream processing. In addition to the overhead for frequent query setup and teardown, such an approach cannot maintain buffered states continuously across multiple executions because backend query execution processes are in isolated memory contexts and are unable to deal with continuously sliding window-like operations across boundaries.

In response to these challenges, an alternative architecture where data warehousing and analytics on data streams are converged is described. Whereas many data warehousing applications and queries utilize a table scan for retrieving data, a function-scan can be used for retrieving unbounded data streams captured on the fly without first storing data from the data stream on a computer readable storage medium, such as a hard disk, optical storage, flash drive, tape storage, or any other type of suitable computer readable storage medium.

In one example, continuous analysis of a data stream is provided, in which a query, including query cycles, can be initialized on a query engine to analyze the data stream for desired information. The data stream can be processed as segments, where a size of the segments can be based on a user-defined parameter. Each segment can be a segment of data from the data stream. The size of the segment can be any convenient size, such as a number of bits, bytes, kilobytes, megabytes, etc. The query cycles can be synchronized with the segments of the data stream. A first segment can be analyzed by performing the query on the first segment to obtain a first result. A query state of the query can be persisted and the query operation can be rewound to begin a new query cycle using a cut-and-rewind query model, which will be described in greater detail below. A second segment can be analyzed in the new query cycle by persisting the same query and performing the query on the second segment based on the first result. As used herein, a "query cycle" can refer to receipt and analysis of a data segment before rewinding the query to analyze a subsequent data segment, which begins a new cycle.

A cut-and-rewind query model can allow a query with full SQL (Structured Query Language) expressive power to be applied to stream data in a chunk-by-chunk manner without shutting the query down between chunks, as is typically done with many queries. Thus, a query state can be continuously maintained across execution cycles of the query, according to sliding-window operators. Based on the concept of a cut-and-rewind query, a cycle-based continuous query (CCQ) model and transaction model is provided. Using cut-and-rewind queries, as well as the CCQ and transaction models which will be described here, a query can retrieve results produced by past execution cycles of the same query.

Conceptually a CCQ can include multiple kinds of query constructs. For example, the CCQ can include 2 kinds of query constructs, including a write construct and a read construct, for respectively producing and consuming cycle-based analytics results. The CCQ can deliver the generated cycle-based analytics results alternatively to two memory resident destination tables, on a cycle-by-cycle basis. One destination table can be for receiving stream analytics results of the current cycle and another destination table can be for holding the result of the last or previous cycle.

In one aspect which will be described in further detail below, the names of these two tables may be swapped in every second cycle for allowing the write construct to always write results to a table with the same name and allowing the read construct to always read from a table with the same name. Temporary cycle result tables can be memory resident in a database buffer pool and swapped without moving or copying content through the use of data dictionary manipulation (to swap the names of the tables). This approach works well with the CCQ semantics of stream processing and can synchronize the production and consumption of the cycle analytics results. The approach also advances stream processing technology by supporting history-sensitive continuous analytics, by supporting in-memory, fast data access, eliminating table content moving and copying as in previous solutions, and leveraging relational database components (e.g., tables, buffer pools, etc.) without introducing new data structures or new shared memory management facilities not already well supported by buffer pool management systems. By producing and consuming information within a single query, the CCQ approach can be directly supported by an extended query engine without relying on an additional middleware system.

Operational-BI (Business Intelligence) can be a data-intensive computation chain from event streams to analysis results. In response to rapidly growing data volumes and a desire for lower latency, data stream management systems (DSMSs) can provide a paradigm shift from a load-first analyze-later mode of data warehousing and other data intensive computation platforms such as Hadoop and Map-Reduce to a near-real-time operational BI mode. The CCQ approach can be useful for obtaining near-real-time operational BI, and can be characterized by integrating stream processing and data warehouses for continuous, "just-in-time" analytics accompanied by continuous result persistence. To support a continuous query, functions and data sources can be integrated, and table scans can be replaced by function scans for turning events captured on the fly into the relational data.

The approaches described can enable support of a truly continuous query and seamless integration of wean processing capabilities into a full functional database system. The result is a powerful and flexible system that can run SQL over tables, streams (tuple by tuple or chunk-by-chunk), or a combination of the tables and streams. Based on the CCQ model and transaction model, integration of the production and the consumption of cycle-based analytics results a same CCQ is explained below.

Referring to FIG. 1, a system 100 for continuous analysis of a data stream is shown in accordance with an example. The system includes a query engine 170 for analyzing a continuous data stream from a stream source 110 for desired information. An analysis server 120 can deliver the continuous data stream to the query engine in data segments. A query 180 executing on the query engine can operate in cycles synchronized with the data segments of the continuous data stream. The system can include a first buffer 140 for receiving a first data segment, a second buffer 150 for receiving a second data segment, and a buffer pool management module 130 for managing alternate reading and writing from the first buffer and the second buffer. The query engine can continuously and alternately query the first buffer and the second buffer such that the first buffer is analyzed while the second buffer receives the second data segment and the second buffer is analyzed while the first buffer receives a third data segment. In this way, the query can be a self-referencing query.

In a further example, the query can be a self-referencing, history-sensitive query. The system can also include a notification module 160 for providing substantially real time notification of receipt of a segment to the query engine to begin executing the query on the segment.

Under the cycle-based continuous query (CCQ) model and cycle-based transaction model, a single CCQ can produce the cycle-based analytics results as well as consume such results generated in the past cycle or cycles. This is the meaning of a self-referencing query as used herein. A self-referencing query can raise a number of issues for efficient continuous query performance which will be described herein, including: how to allow the generation and the retrieval of cycle-based analytics results to be integrated in the same CCQ, how to allow the real-time analytics to access the analytics results generated in the last cycle, and how to make such self-referencing efficient through memory access without storing data on a disk.

Linear Road (LR) benchmarking is a widely accepted standard for benchmarking stream processing performance. LR benchmarking typically models streaming data as traffic on multiple expressways for a predetermined duration, such as three hours for example. In one example, each expressway has two directions and 100 segments. Cars enter and exit the lanes at segment boundaries and the position of each car is read every 30 seconds. Each reading constitutes an event for the system. Computation of the segment statistics (i.e., the number of active cars), average speed, and a 5-minute moving average speed, as well as segment tolls generated has been recognized as the production of summarized analytics results in every minute time window. The continued retrieval of segment statistics in the last minute consumes the above results. However, unlike other reported LR implementations where segment statistics is calculated by ad-hoc systems, the present focus is on having continuous, minute-cycle based segment statistics measurements where minute-cycle based segment tolls are generated and synchronously consumed by a single, long standing cycle-based stream query.

Using the Linear Road (LR) example, the issues regarding self-referencing queries described above can be alternately described as: how to allow the generation and the retrieval of the segment statistics and tolls to be integrated in the same CCQ, how to allow the real-time toll notification (i.e., for each ear to access the segment toll generated in the last cycle), and how to make the segment statistics and tools generated in a cycle to be retained in memory to be used in the next cycle.

The following discussion will focus on the most common situation where a CCQ produces cycle-based analytics results with one construct and consumes such results of the last cycle with another construct. As mentioned above, the CCQ conceptually contains two kinds of legs, or query constructs, for respectively producing and consuming the cycle-based analytics results. In other words, the query constructs for producing and consuming such information can be integrated in a single CCQ. The CCQ can deliver the generated cycle-based analytics results to two destination tables or buffers 140, 150. For example, the two tables may be named CR1 and CR2, for illustration purposes. Cycle-based analytics results can be delivered to CR1 and CR2 alternatively, cycle-by-cycle (i.e., switching the destination table in every second cycle). Assuming that in cycle N the result is written to CR1, then in cycle N+1 the result can be written to CR2. CR1 can then be read by a query construct that retrieves the analytics results (e.g., summary information) of the last cycle for real-time analytics of the result of CR2. The tables CR1 and CR2 can be temporary cycle result tables and can be memory resident in the database buffer pool and swapped without moving or copying content through use of data dictionary manipulation. This can eliminate much of the complexity for introducing other data structures not naturally recognized by an SQL query and for managing shared memory in addition to an already well-managed buffer pool. In one aspect, the data dictionary manipulation can be a manipulation of meta-data manipulation. The data dictionary manipulation will be described in further detail below.

The CCQ approach can be based on the understanding that query processing in database systems is essentially done by streaming tuples through relational operators. While a query engine may be viewed essentially as a streaming engine, the focus of the present discussion is on extending the data and transaction models to accommodate streaming semantics. To begin, relation data can be used to feed one or more queries continuously. A type of table function, called Stream Source Function (SSF), can replace a database table, which typically contains a set of tuples on a disk. An SSF can return a sequence of tuples to feed queries without first storing the tuples on the disk. An SSF can listen to or read data/event sequences and continuously generate stream elements, tuple by tuple. An SSF can be called multiple (or potentially an infinite) number of times during the execution of a continuous query. Each SSF call can return one tuple. When an end-of-data event or condition is detected, which can be either due to an event source being exhausted or due to user interaction, the SSF can signal the query engine to terminate the query execution. As long as the data stream does not end, the query can continue without end.

Stream analytics is generally a data-continuous process, but streamed data is often processed in chunks. Such chunks may typically fall in specific time windows. The above-mentioned cut-and-rewind query processing model can enable a SQL query 180 to be applied to stream data chunk-by-chunk while maintaining the continuity of the query instance. Under this query model, stream data is processed by a single, long-standing query fed by an SSF. Based on a user-defined parameter on the granularity of a "chunk", the SSF can supply an end-of-data signal periodically that is interpreted by the query engine 170 and results in the termination of the current cycle of query execution.

Upon the termination of the query cycle the query engine may not shut down the query but can rewind the query for processing the next chunk of stream data. The rewinding process can involve executing a rescan method on each node of a query plan instance tree in a top-down order. The cut-and-rewind approach divides a continued query execution into a sequence of cycles, each for processing a chunk of data. The approach can allow a query with full SQL expressive power to be applied to streams in a chunk-by-chunk fashion, while also continuously maintaining the data buffered in sliding window oriented operations (typically User Defined Functions (UDFs) across the execution cycles. The cut-and-rewind approach also provides performance advantages due to the elimination of frequent query setup and teardown overhead.

Typically a query is placed in a transaction boundary. The query result and the possible update effect are made visible after the query evaluation ends. As a result, access to data results for a long-running transactional query is blocked until the query has ended. To address this issue, a cycle-based transaction model can be used in conjunction with the cut-and-rewind query model such that a cycle based stream query is committed cycle-by-cycle in a sequence of micro-transactions. The micro-transaction boundaries can be the same as the query cycles and thus be synchronized with the chunk-wise stream processing. Per-cycle stream processing results can be made visible as soon as the cycle ends and can be continuously visible regardless of whether the table is involved in subsequent cycle-based transactions.

An additional isolation level, such as a cycle based read committed isolation level, can be introduced and enforced by an appropriate locking mechanism. Unlike a regular query where results are either delivered to a client or stored in the database, the query engine 170 can be extended to allow query results flow the client continuously while also persisting to the database, if desired. To support this approach, both SELECT INTO and INSERT INTO facilities can be extended to SQL.

In order to allow operations in a query to communicate, a common method is used which provides the shared memory with an appropriate visibility scope. Facilitating shared memory may be considered trivial, but memory management in previous systems is outside of the scope of the query engine 170 and is implemented in case specific scenarios. The continuous data analytics system 100 uses a database buffer pool for communication of query operations, which is enabled by providing a buffer pool as a general shared memory for database backend processes which is managed by the DBMS. Further, schema-aware relations can be used as a common data type for the communication of the query operations. This feature can also be supported by the DBMS.

With previous database technologies, the buffer pool is used for buffering data retrieved from the database or inserted into the database. Writing data to the buffer pool aims to persist the data to the database, either directly (such as with the regular SELECT INTO operation) or asynchronously through the Write-Ahead Logging (WAL), as used with INSERT INTO. However, in the present technology, the buffered data is retained temporarily in memory without storing the data on a disk. This allows access to the data from memory without retrieval from a disk. In this approach, each tuple inserted into memory can be marked appropriately (the mark may vary from DBMS to DBMS) such that when the DBMS sees such a mark, the DBMS will not persist the tuple to the disk.

Figure 2:
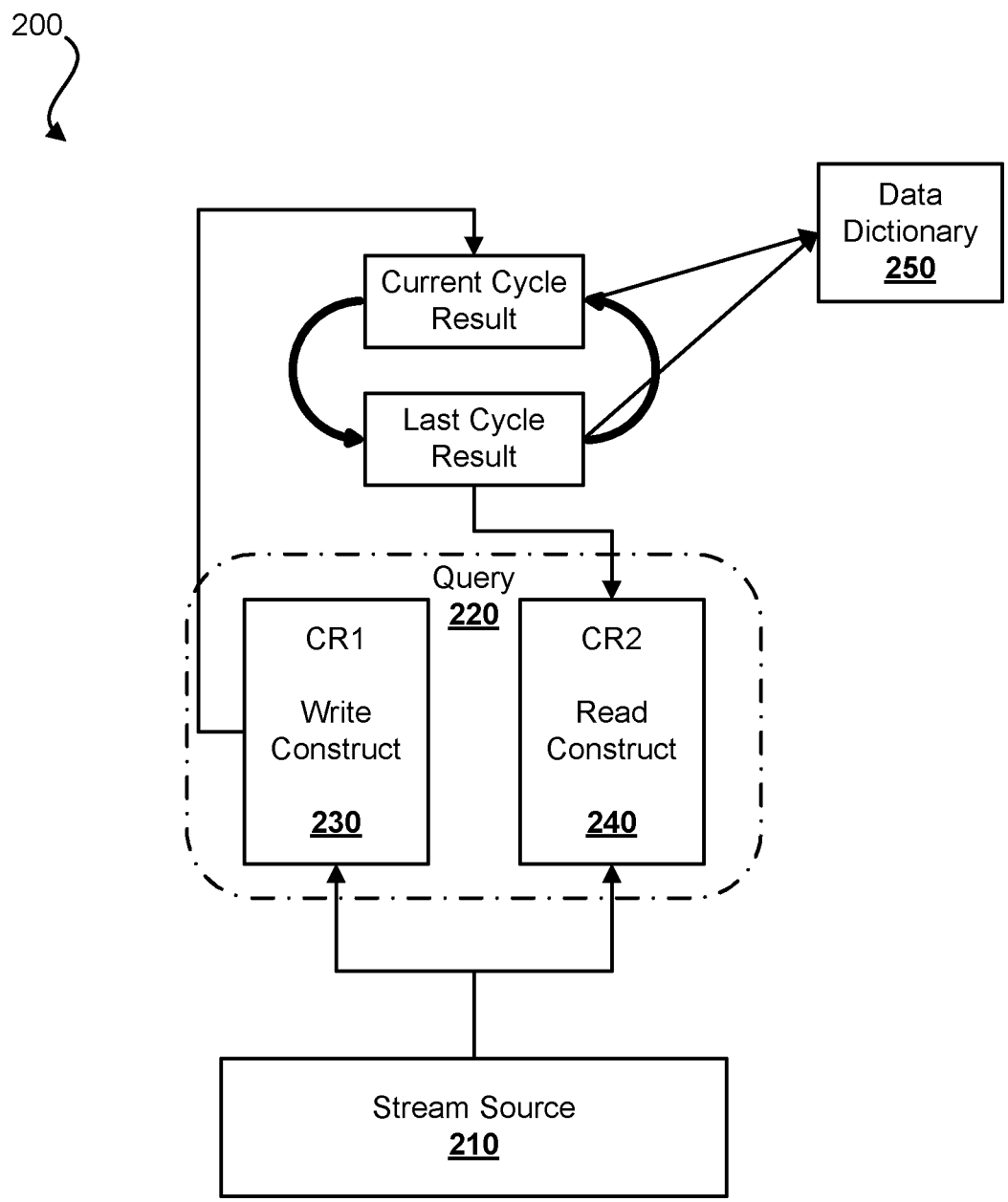
FIG. 2 is a block diagram of a system for continuous analysis of a data stream involving a data dictionary in accordance with an example.

Reference will now be made to FIG. 2. A stream source 210 provides a data stream which can be consumed and analyzed by a query 220 in the system 200. For providing self-referencing, a CCQ can be provisioned with two in-memory destination tables (CR1 230 and CR2 240) to deliver cycle summary results. In each cycle, the cycle summary oriented query result is delivered to CR1, and the result of last cycle is held in CR2 and retrieved by the query construct of the same query for real-time analytics. By the end of each cycle, CR2 is truncated, i.e. emptied. The names of CR1 and CR2 are swapped through data dictionary 250 manipulation, but the contents of CR1 and CR2 are not moved or copied. In this case, the original write-table CR1 becomes the read-table CR2, and the original read-table CR2 becomes the write-table CR1. In the next cycle, a generated cycle summary can still be written to CR1, and the last cycle summary can still be retrieved from CR2 (where CR1 is the previous CR2 and CR2 is the previous CR1). With this approach in handling data reading and writing, table content moving and copying can be eliminated for switching between tables and latency can be significantly reduced as a result.

As described above, the present approach extends the query engine to support SSF, a cycle-based continuous query model, and the cycle-based transaction model. In order to support the CCQ self-referencing approach, additional query engine capabilities can be provided, including the swapping of cycle query result tables through data dictionary manipulation, a heap-insert method with appropriate marks to instruct a Database Writer (DBW) and the Write Ahead Logger (WAL) not to persist heap inserted tuples to the disk. The query engine extension works with the SSFs that feed data to CCQs. Regular functionalities of a SSF for supporting CCQ include capturing the end-of-data condition, signaling the query engine to terminate the current cycle execution, and buffering the first input tuple of the next cycle (since the end-of-data condition may be typically derived from that tuple). Additional capabilities for a SSF to support resulting table swapping may include truncating the table holding the last cycle results, and swapping the names of the resulting tables, using application programming interfaces (APIs) provided by the extended database engine.

Figure 3:
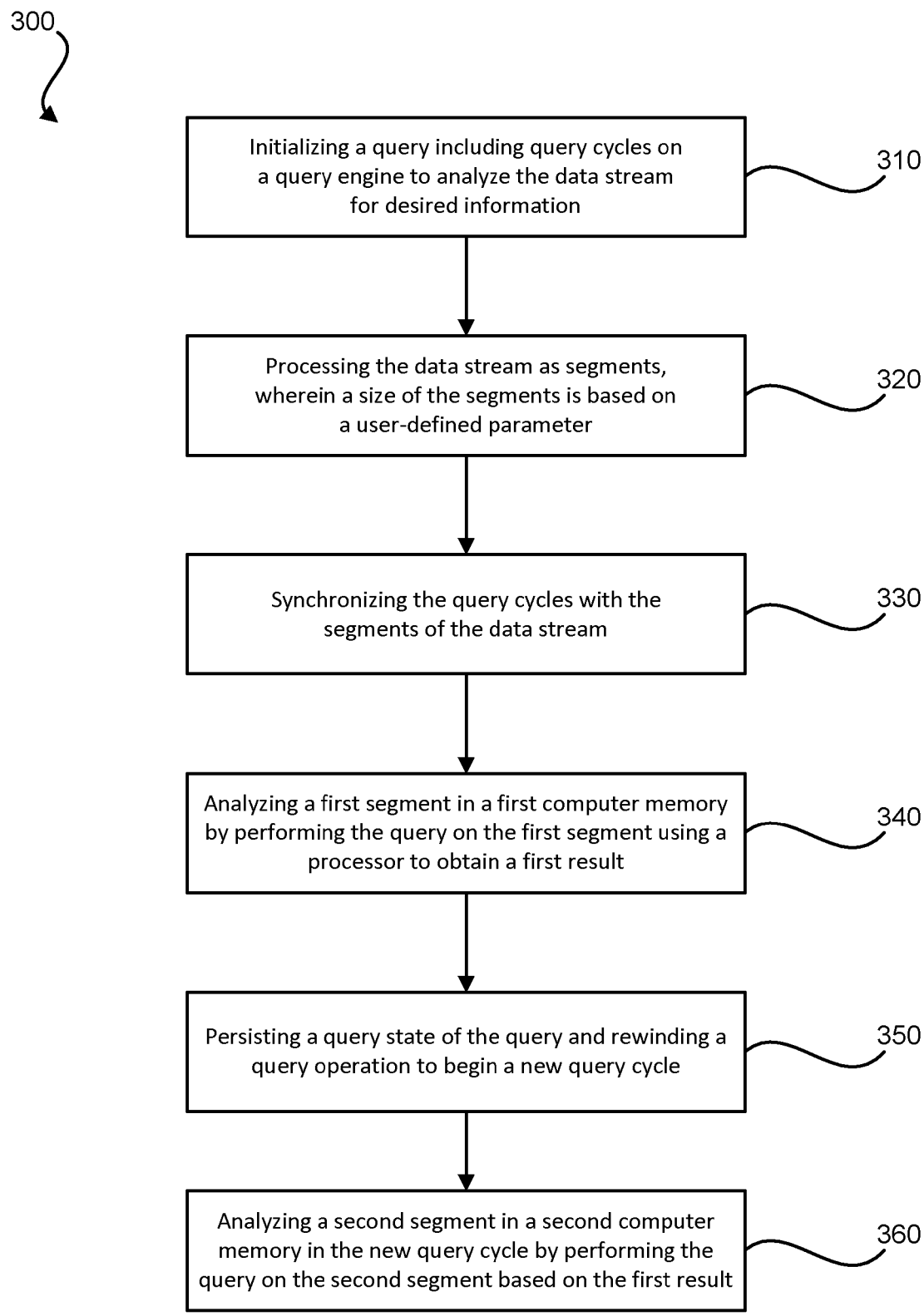
FIGS. 3-4 are flow diagrams of methods for continuous analysis of a data stream in accordance with an example.

Reference will now be made to FIG. 3 in which a method 300 is shown for continuous analysis of a data stream in accordance with an example. The method can include initializing 310 a query including query cycles on a query engine to analyze the data stream for desired information. The data stream can be processed 320 as segments. A size of the segments can be based on a user-defined parameter. The query cycles can be synchronized 330 with the segments of the data stream. A first segment in a first computer memory can be analyzed 340 by performing the query on the first segment using a processor to obtain a first result. A query state of the query can be persisted 350 and query operation can be rewound to begin a new query cycle. A second segment in a second computer memory can be analyzed 360 in the new query cycle by performing the query on the second segment using the processor and based on the first result. In one aspect, the method can provide substantially real time notification of receipt of a segment.

In one example, the method can include receiving a second segment. Analysis of the first segment can be performed as the second segment is received. In another example, analysis of the second segment based on the first result can include the performance of history-sensitive continuous analytics. The method can also include sustaining a buffer across query cycles to provide a sliding query window. In other words, the data in the tables, as well as the query, can be persisted, and the window or segment of the data stream under analysis is "slid" when the query is rewound to begin in an alternate table.

The method can include computing structured query language (SQL) aggregate functions for each segment without persisting the context of the aggregate functions from one segment to the next. The first computer memory and the second computer memory in the method may respectively comprise a first table and a second table. In this example, the method can further include truncating the first table after analyzing the second segment and analyzing a third segment in the first table. In another example, the first computer memory and the second computer memory may respectively comprise a first table and a second table. The first table can be a write table, the second table can be a read table, and the method can further include swapping the names of the first table and the second table using data dictionary manipulation. As described above, swapping the names can include renaming the write table to be the read table and renaming the read table to be the write table. The swapping operation can be used to swap the table names without copying or moving contents of the first table and second table.

Figure 4:
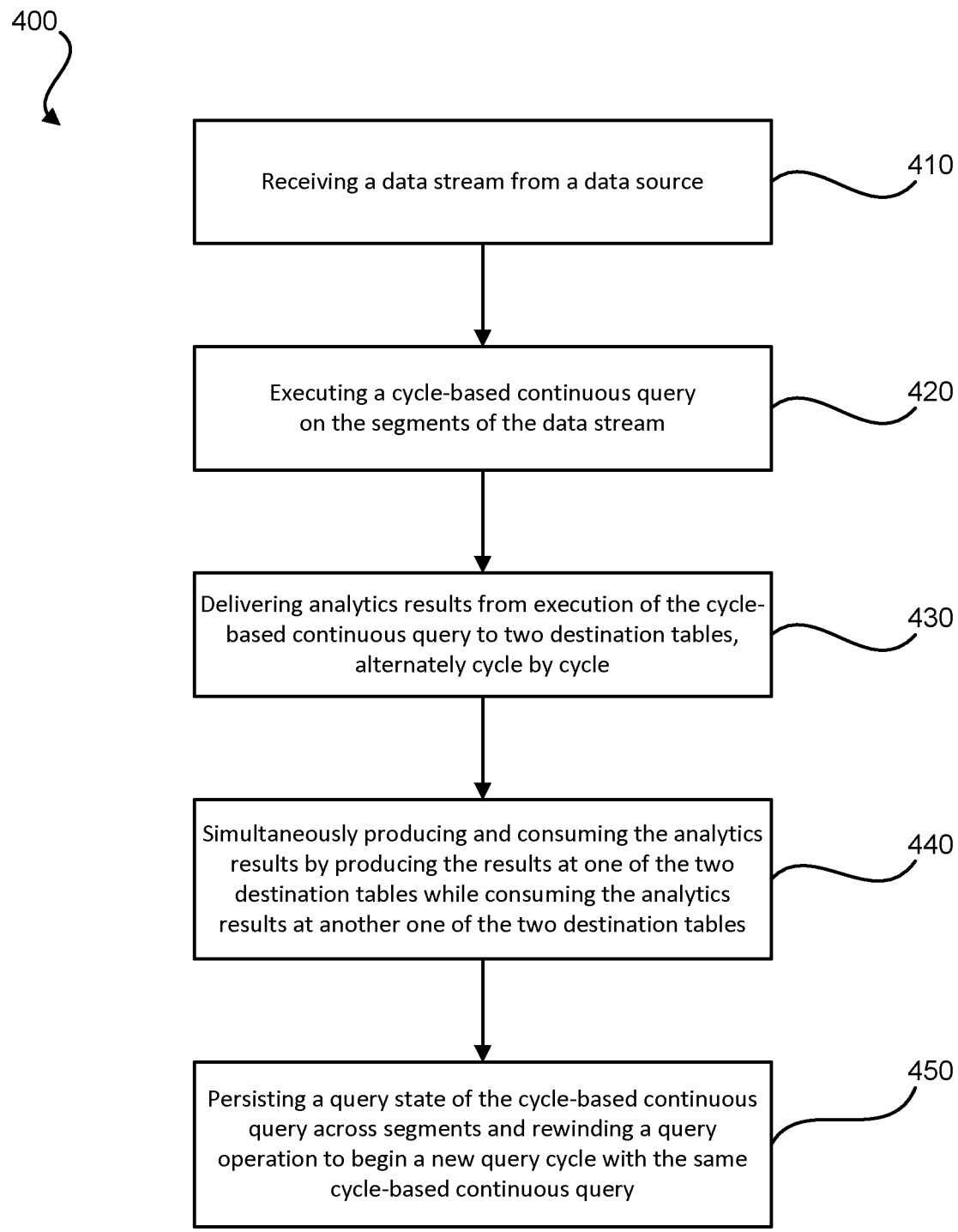

Referring to FIG. 4, a method 400 for continuous analysis of a data stream is shown in accordance with another example. The method can include receiving 410 a data stream from a data source. A cycle-based continuous query can be executed 420 on the segments of the data stream. Analytics results from execution of the cycle-based continuous query can be delivered 430 to two destination tables, alternately cycle-by-cycle. The method can include simultaneously producing and consuming 440 the analytics results by producing the results at one of the two destination tables while consuming the analytics results at another one of the two destination tables. Also the method can include persisting 450 a query state of the cycle-based continuous query across segments and rewinding a query operation to begin a new query cycle with the same cycle-based continuous query.

With the above discussion of systems and methods in mind, some additional examples and experiments will now be described using the Linear-Road (LR) benchmark to demonstrate how use of a query engine as described fits within stream processing. Computation of the segment statistics (i.e. the number of active cars, average speed, and the 5-minute moving average speed (dimensioned by express way, direction and segment)) has been recognized as a computational bottleneck of the benchmark. The continued retrieval of segment statistics in subsequent stream processing has been recognized as a latency bottleneck. Unlike other reported LR implementations where segment statistics are calculated by ad-hoc programs, the present approach uses a cycle-based querying and transaction model which enables continuous minute-cycle based segment statistics measurement and generation of minute-cycle based segment tolls by the query engine directly in a single, long standing cycle-based stream query. An example of such a query using the LR benchmark is as follows:

```
INSERT INTO toll table
SELECT minute, xway, dir, seg, lr_toll(r.traffic_ok, r.cars volume)
FROM (
    SELECT minute, xway, dir, seg, cars_volume,
    lr_moving_avg(xway, dir, seg, minute, avg_speed) AS mv_avg,
    traffic_ok
    FROM (
        SELECT floor(time/60)::integer AS minute, xway, dir, seg,
        AVG(speed) AS avg_speed,
        COUNT(distinct Vid))::INTEGER AS cars_volume,
        MIN(lr_acc_affected(vid,speed,xway,dir,seg,pos) AS traffic_ok
        FROM STREAM_CYCLE_lr_data(60, 180, 1)
        WHERE lr_notify_toll(vid, xway, dir, seg, time)>=O
        GROUP BY minute, xway, dir, seg
    ) p
) r
WHERE r.mv_avg > 0 AND r.mv_avg <40;
```

The above query can be understood in terms of the foregoing discussion as well as the following explanations.

Stream Source Function. Streaming tuples are generated by the SSF, STREAM_CYCLE_LR(time, cycles), from the LR data with timestamps fed in by a data drives in real time. The parameter "time" is a time-window size in seconds; "cycles" is the number of cycles the query is desired to run. For example, STREAM_CYCLE_LR(60, 180) can deliver the tuples from every minute (60 seconds), 180 times (for 3 hours).

Cut-and-Rewind (cycle based execution). The query can be repeatedly applied to data chunks falling in 1-minute (or other suitable duration) time-windows during an execution cycle. The query can rewind 180 times (or any other set number of cycles) in a single query instance. A sub-query with alias p can yield the number of active cars and an average speed of the active cars for every minute, dimensioned by segment, direction and expressway. The SQL aggregate functions can be computed for each chunk with no context carried over from one chunk to the next.

Sliding Window Function (per-tuple history sensitive). The sliding window function lr_moving_avg( ) can buffer the per-minute average speed for accumulating a dimensioned 5-minute moving average. Since the query is rewound but not shut down, the buffer can be sustained continuously across query cycles.

Continuous Querying with Continuous Persisting. The top-level construct of the LR query is the INSERT-SELECT phrase. With the query engine extension, the INSERT-SELECT phrase can deliver a resulting stream returned from the SELECT query (r) to a client and append the resulting stream to a toll table on a per-cycle basis. The transactional LR query result can be committed at each cycle to make the cycle based result accessible to a user as soon as the cycle ends. The query result can also be continuously accessible after the end of the cycle, even when or after a new result set of the subsequent cycle is inserted in the table. This is a cycle-based isolation level and can be supported with a DBMS (Database Management System) locking mechanism.

Self-Referencing. The query is "self-referenced" or "self-referencing. In other words, the query can retrieve results produced in the past or previous execution cycle(s) by the same query or query instance. Continuing the LR benchmark example, the query can calculate a per-segment per-minute toll based on a volume of cars, the 5-minute moving average, and any effects from accidents. The results can be committed per-cycle (e.g., 1 minute) and heap-inserted into the toll-table. The results are likely to stay in memory for a time or may be forced to stay in memory by a specific optimization mechanism used in an extended heap-insert. The query can simultaneously calculate a per-car toll notification using a UDF (user defined function). The query can efficiently access the segment toll in the last minute directly from the memory resident table in the current cycle while keeping track of the information for the cars, and can emit a toll notification for each car entering a new segment based on the segment tolls generated in the last cycle (e.g., the last minute).

Experimental results indicate the approach performs competitively with results Produced by other known DBMSs with stream processing, databases, middleware, or other components developed separately. The present approach pushes stream processing down to the query engine with zero data movement overhead and with efficient direct heap insertion. Compared to other approaches, middleware has been eliminated for scheduling time-window apart querying and other functionality. The approach can also be generalized to a massively parallel processor (MPP)-based data warehouse and can be used to build a parallel, data-intensive, continuous analytics platform.

Some benefits of the stream processing approach described are as follows. The systems and methods can cope well with the window semantics of stream processing in a cycle-based query model and transaction model. The systems and methods advance stream processing technology by supporting history-sensitive continuous analytics. The systems and methods provide synchronization of analysis summary production and consumption, since both production and consumption can be made in a same CCQ. For example, the consumption in the next cycle may not start before the production in a current cycle finishes. The systems and methods support in-memory, last data access to the cycle summary tables and can eliminate the table content moving and copying in switching those tables. The systems and methods can leverage existing relational database components (e.g., tables, buffer pools, etc.) without introducing new data structures not recognized by the DBMS or other new shared memory management facilities aside from an already well-supported buffer pool management. Furthermore, all of the mechanisms of the systems and methods, including the self-referencing functionality, can be directly supported by the extended query engine without relying on an additional middleware system.

The methods and systems of certain embodiments may be implemented in hardware, software, firmware, machine readable instructions, and combinations thereof. In one embodiment, the method can be executed by software or firmware that is stored in a memory and that is executed by a suitable instruction execution system. If implemented in hardware, as in an alternative embodiment, the method can be implemented with any suitable technology that is well known in the art.

Also within the scope of an embodiment is the implementation of a program or code that can be stored in a non-transitory machine-readable storage medium to permit a computer to perform any of the methods described above.

Some of the functional units described in this specification have been labeled as modules, in order to more particularly emphasize their implementation independence. The various modules, engines, tools, or modules discussed herein may be, for example, software, firmware, commands, data files, programs, code, instructions, or the like, and may also include suitable mechanisms. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents for performing desired functions.

While the forgoing examples are illustrative of the principles of the present technology in particular applications, it will be apparent that numerous modifications in form, usage and details of implementation can be made without the exercise of inventive faculty, and without departing from the principles and concepts of the technology. Accordingly, it is not intended that the technology be limited, except as by the claims set forth below.

The invention claimed is:

1. An article of manufacture including a non-transitory computer usable medium having computer readable program code embodied therein for continuous querying of a data stream, comprising computer readable program code capable of performing the operations of:

initializing a query including query cycles on a query engine to query the data stream for desired information;

processing the data stream as segments, wherein a size of the segments is based on a defined parameter;

synchronizing the query cycles with the segments of the data stream;

analyzing a first segment in a first computer memory by performing the query on the first segment using a processor to obtain a first result;

persisting query state of the query and rewinding a query operation to begin a new query cycle; and analyzing a second segment in a second computer memory in the new query cycle by performing the query on the second segment using the processor and based on the first result.

2. An article of manufacture as in claim 1, wherein the computer readable program code is further capable of providing substantially real-time notification of receipt of a segment.

3. An article of manufacture as in claim 1, wherein the computer readable program code is further capable of receiving a second segment and wherein analyzing the first segment is performed as the second segment is received.

4. An article of manufacture as in claim 1, wherein analyzing the second segment based on the first result comprises performing history-sensitive continuous analytics.

5. An article of manufacture as in claim 1, wherein the computer readable program code is further capable of sustaining a buffer across query cycles to provide a sliding query window.

6. An article of manufacture as in claim 1, wherein the computer readable program code is further capable of computing structured query language (SQL) aggregate functions for each segment without persisting context of the aggregate functions from one segment to the next.

7. An article of manufacture as in claim 1, wherein the first computer memory and the second computer memory respectively comprise a first table and a second table, the method further comprising:

truncating the first table after analyzing the second segment; and analyzing a third segment in the first table.

8. An article of manufacture as in claim 1, wherein the first computer memory and the second computer memory respectively comprise a first table and a second table, the first table comprising a write table and the second table comprising a read table, and wherein the computer readable program code is further capable of:

swapping the names of the first table and the second table using data dictionary manipulation, said swapping comprising:

renaming the write table to be the read table; and renaming the read table to be the write table.

9. An article of manufacture as in claim 8, wherein swapping comprises swapping the names without copying or moving contents of the first table and second table.

10. A system for continuous querying of a data stream, comprising:

a query engine to analyze a continuous data stream for desired information;

an analysis server to deliver the continuous data stream to the query engine in data segments;

a query to execute on the query engine in cycles synchronized with the data segments of the continuous data stream;

a first buffer to receive a first data segment;

a second buffer to receive a second data segment; and a buffer pool management module to manage alternately reading and writing from the first buffer and the second buffer, wherein the first buffer comprises a write buffer and the second buffer comprises a read buffer, and the buffer pool management module is to swap the names of the first buffer and the second buffer using data dictionary manipulation by renaming the first buffer to be a read buffer and the second buffer to be a write buffer.

11. A system as in claim 10, wherein the buffer pool management module is to swap the names of the first buffer and the second buffer without copying or moving contents of the first buffer and second buffer.

12. A system as in claim 10, wherein the query comprises a self-referencing, history-sensitive query, and wherein the query engine is to continuously and alternately query the first buffer and the second buffer such that the first buffer is analyzed while the second buffer receives the second data segment and the second buffer is analyzed while the first buffer receives a third data segment.

13. A system as in claim 10, further comprising a notification module to provide substantially real time notification of receipt of a segment to the query engine to begin executing the query on the segment.

14. A method for continuous querying of a data stream, comprising, by a computer:

receiving (410) a data stream from a data source;

executing a cycle-based continuous query on the segments of the d a stream;

delivering analytics results from execution of the cycle-based continuous query to two destination tables, alternately cycle-by-cycle;

simultaneously producing and consuming the analytics results by producing the results at one of the two destination tables while consuming the analytics results at another one of the two destination tables; and persisting query state of the cycle-based continuous query across segments and rewinding a query operation to begin a new query cycle with the same cycle-based continuous query.

* * * * *